*INVENTOR.*
WILLIAM T. BARKER

BY *Richard F. Carr*

ATTORNEY

April 17, 1962 W. T. BARKER 3,029,912
SEALING ARRANGEMENT FOR FASTENERS
Filed Sept. 26, 1957 2 Sheets-Sheet 2

INVENTOR.
WILLIAM T. BARKER
BY Richard F. Carr
ATTORNEY

United States Patent Office 3,029,912
Patented Apr. 17, 1962

3,029,912
SEALING ARRANGEMENT FOR FASTENERS
William T. Barker, Los Angeles, Calif., assignor to
North American Aviation, Inc.
Filed Sept. 26, 1957, Ser. No. 686,535
1 Claim. (Cl. 189—36)

This invention pertains to a method and means for sealing fasteners and more particularly to such an arrangement adapted for high temperature installations.

The problem of sealing around fasteners has become particularly acute with regard to aircraft fuel tanks constructed integral with the aircraft structure. For example, in present day aircraft, the fuel tank may comprise the interior of the wing or a segment of the fuselage with the skin of the wing or fuselage acting as a wall of the tank. The structure is held together by fasteners, yet no leakage at these members may be tolerated. Also, fasteners at an exterior surface of the aircraft must be flush with the aircraft skin in order to preclude excessive drag. The loads from twisting, bending and vibration have complicated the sealing problem for these fasteners, and conventional gaskets have not proven satisfactory. As an additional factor, as aircraft speeds have increased, the temperatures of the components thereof have also risen. These higher temperatures have made the sealing problem even more severe, and have led to further difficulties with conventional gaskets or sealing materials.

The present invention overcomes these problems by means of a soft metallic slug driven into a recess at the head of the fastener and retained therein by undercut portions in the fastener. The slug then is trimmed flush with the outer surface so that the fastener not only is sealed, but no protuberances result. When used with a rivet having a hollow sleeve and an expander pin therein, the head of the sleeve may be received entirely within an enlarged recess in the work. The slug is driven into this recess over the head of the sleeve, into an additional recess in the sleeve at the pin, and held in place by undercuts in the sleeve or pin, or both. This seals both around the exterior of the sleeve and also through the interior between the pin and the sleeve.

Therefore, an object of this invention is to provide a sealed fastening means. Another object of this invention is to provide a sealed fastening device adaptable for high temperature installations. A further object of this invention is to provide a fastening means which presents a flush outer surface. Yet another object of this invention is to provide a fastening means adapted for mass-production techniques. These and other objects will become apparent from the following detailed description taken in connection with the accompanying drawing in which FIG. 1 is a sectional view showing a fastener as initially inserted in work to be secured;

Figure 1:
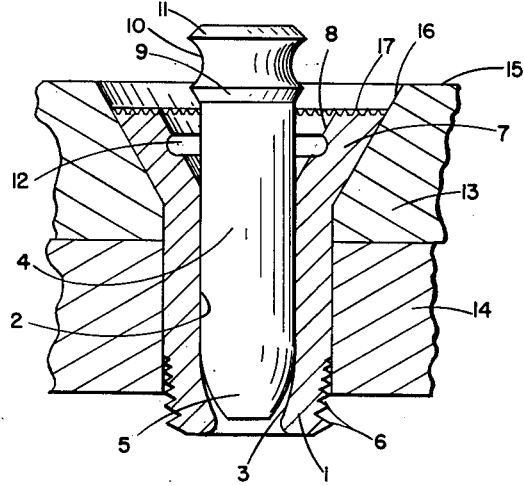
Figure 3:
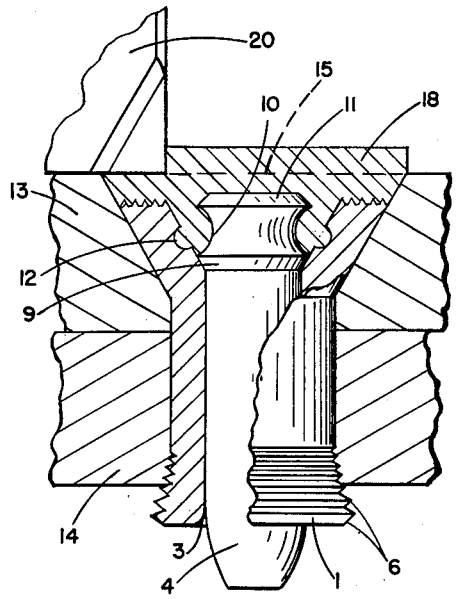
FIG. 3 is a sectional view similar to FIG. 1 illustrating the fastener in its final position and the cutting of the metallic slug to provide a flush exterior surface.
Figure 2:
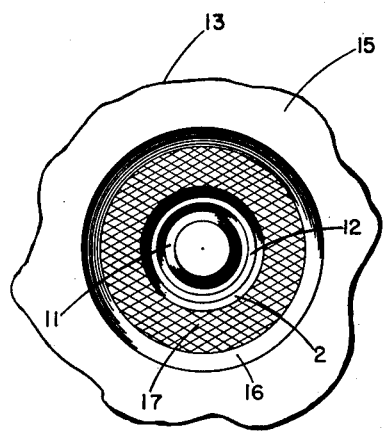
FIG. 2 is a top plan view of the arrangement of FIG. 1.

As shown in FIGS. 1, 2 and 3 of the drawing, the sealing arrangement of this invention may be used with a blind fastener of the type illustrated in U.S. Patent 2,751,809. This type of fastener includes a shank in the form of a hollow sleeve 1 having a substantially cylindrical inner surface 2 provided with an inwardly curving portion 3 at one end thereof. A pin 4, complementary to the interior of the sleeve, is adapted to be driven therein with its inwardly curved end 5 engaging curved portion 3 of the sleeve for expanding the sleeve to provide an upset head on the blind side. Preferably grooves 6 are provided in the exterior of the sleeve to add to the holding power. It is obvious that when so assembled leakage is possible around the exterior of the sleeve and between the sleeve and the pin.

According to the provisions of this invention head 7 of the sleeve is provided with a recessed portion 8 having a diameter larger than that of cylindrical portion 2. The pin is provided with a first shoulder 9 spaced inwardly from its upper end, and an undercut portion 10 in the form of an annular groove between that shoulder and the outer end 11 of the pin. When the pin is driven into the sleeve shoulder 9 engages the sleeve at the bottom of the recess. Additionally, the interior of the head of the sleeve may be undercut by an annular groove 12, which is located opposite undercut portion 10 of the pin when the pin is in place within the sleeve.

Figure 4:
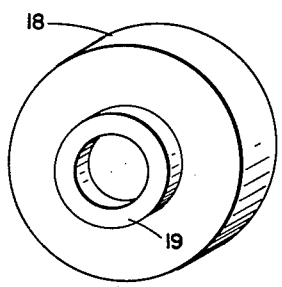
FIG. 4 is a perspective view of the sealing slug to be driven in the recess in the work and in the fastener.

When the rivet is used to secure together members such as sheets 13 and 14, the outer surface 15 of the sheet 13 is recessed in the form of a countersink 16 of such dimensions that the sleeve is entirely received therein with outer end 17 of the sleeve spaced inwardly from outer surface 15 of sheet 13. The pin is then driven into the sleeve upsetting the head on the blind side and locating the projecting portion of the pin likewise entirely within recess 16. Following this, a slug 18 of relatively soft material such as 2S aluminum, is disposed over the assembled rivet in the recess. The slug is then driven into the recess so that it is deformed to provide a plug complementary to the interior of the recess and filling undercuts 10 and 12. These hold the slug in place within recess 16. Preferably, as seen in FIG. 4, an annular ridge 19 is provided on the bottom of the slug to assist it in assuming the contour of the portions of the rivet within recess 16.

When the slug has been driven firmly into place, it then may be trimmed off flush with the exterior surface 15 of sheet 14. This may be done, for example, by a milling cutter 20. In this manner the riveting arrangement of this invention provides a perfectly smooth, fluid imervious exterior surface. Preferably outer end 17 of the head of the sleeve is knurled to prevent movement of the slug during the trimming operation.

The slug so provided within recess 16 of the work and within the recessed portion of the head entirely filling the space therein seals against leakage through and around the pin, including leakage which may occur between members 13 and 14 in some installations. The soft, malleable characteristics of the slug assure that it can deformed properly so that it entirely fills the spaces and can seal off any tendency toward leakage. In this manner a sealed fastener is provided which will withstand very high temperatures, which is rugged in construction, and not subjected to damage from loads imposed upon the members with which it is associated. The rivet is readily adapted to production techniques and provides a smooth exterior surface.

Figure 5:
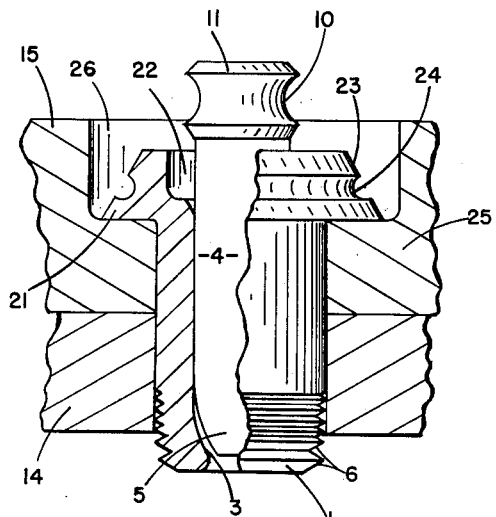
FIG. 5 is a sectional view similar to FIG. 1, showing an embodiment of the fastener which includes an undercut in the exterior of the head.
Figure 6:
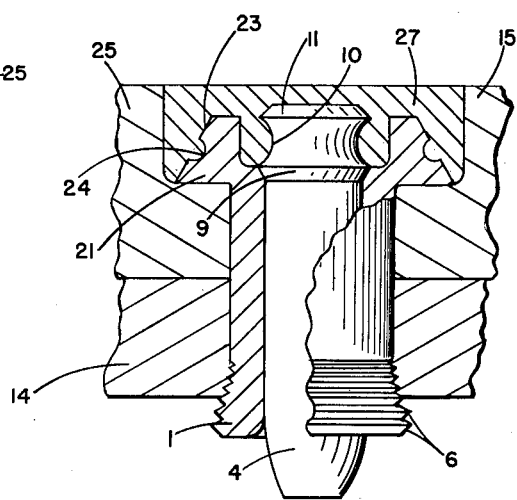
FIG. 6 is a sectional view showing the fastener of FIG. 5 in its fully installed position with the sealing slug in place.
Figure 7:
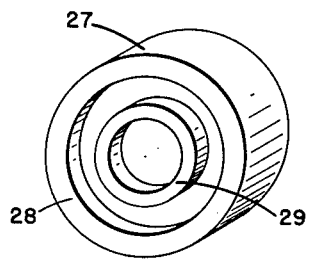
FIG. 7 is a perspective view of the sealing slug for the embodiment of FIGS. 5 and 6 prior to installation.
Figure 9:
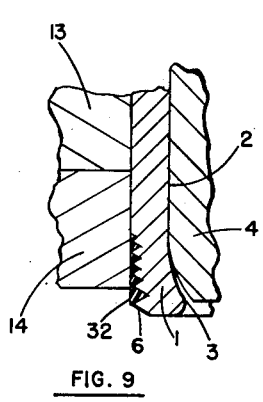
FIG. 9 is a fragmentary sectional view showing an additional sealing arrangement for the grooves of the sleeve of the fastener.
Figure 10:
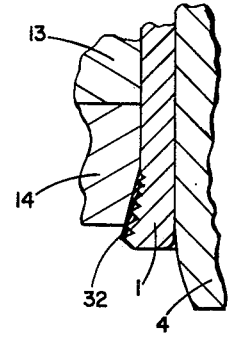
FIG. 10 is a fragmentary sectional view of the arrangement of FIG. 9 after fastener is fully installed.

According to the modification of FIGS. 5 and 6, the head 21 of the sleeve is provided with a straight-walled recess 22 in the form of a counterbore, while the exterior surface 23 thereof is in frusto-conical form. An undercut in the form of an annular groove 24 is provided in the outer wall of the head of the sleeve. The work 25 is recessed by a counterbore at 26 to entirely receive the head of the sleeve, and the pin may have substantially the same form as in the previously described embodiment. After the pin has been driven into place, soft metallic slug 27, having projecting annular ridges 28 and 29 (see FIG. 7), is driven into the recess in the work and in the head of the sleeve, being retained in place by the undercuts in the pin and in the head, and filling the entire area in the recess so as to preclude leakage either through or around the sleeve. Again the slug may be milled to present a flush outer contour. The frusto-conical form of the head of the sleeve permits the slug to be driven into the recess to be held by groove 24. This embodiment may be preferred when the work is of sufficient thickness so that removal of the extra stock for the larger recess 26 presents no difficulty.

Figure 8:
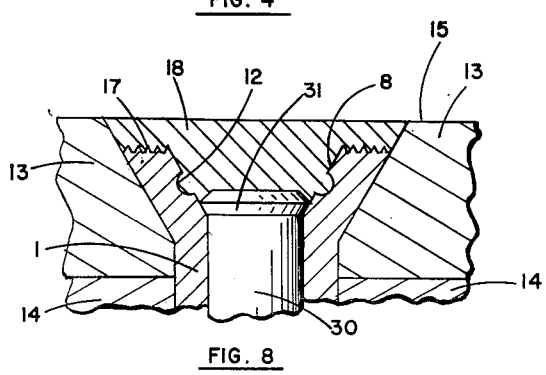
FIG. 8 is a sectional view similar to FIGS. 3 and 6, illustrating a modified form of fastener in which the undercut is provided only in the sleeve portion of the fastener.

According to the modification of FIG. 8, pin 30 does not project beyond shoulder 31 into recess 8 in the sleeve. With this simplified arrangement, only undercut 11 retains the slug in the recess. Again the slug seals the interior and exterior portions of the sleeve. As an additional sealing feature, it is possible also to fill the annular grooves 6 of the sleeve with a bonded silicone rubber 32 or equivalent material, prior to installation of the sleeve in the hole. This material, by being bonded in place, will be retained within the grooves and is of a type which will withstand high temperatures when the sleeve is expanded subsequently as the pin is driven therein. The sealant in the grooves entirely seals the area around the exterior of the sleeve.

The foregoing description of the invention in certain embodiments is to be understood as given by way of illustration only, the spirit and scope of this invention being limited solely by the appended claim.

I claim:

A sealed fastening arrangement for securing sheet members together comprising a hollow sleeve inserted through said sheet members, said sleeve having a head with a frusto-conical external surface on one end and an expanded portion at the other, a pin in said sleeve substantially filling the interior thereof, one of said sheet members having a frusto-conical recess in its outer surface receiving said head, said recess being generally complementary to said head external surface and deeper and wider than the depth and width of said head, said sleeve head having an interior frusto-conical surface diverging toward the outer surface of said sheet and having a first annular groove in said interior surface, said pin having a head portion with a second annular grove thereon disposed oppositely to said first annular groove and extending into said frusto-conical sleeve portion and spaced therefrom to form with said first and second annular grooves a cavity, a relatively soft plug in said recess substantially filling said recess and said cavity and being keyed into said first and second annular grooves, said soft plug covering the sleeve and pin and sealing between the sheet member and sleeve and between the sleeve and pin and having an outer surface flush with the outer surface of said sheet, and means on the upper surface of the sleeve head for engaging said soft plug to prevent rotational movement of said plug.

References Cited in the file of this patent

UNITED STATES PATENTS

| | | |
|---|---|---|
| 539,627 | Lines | May 21, 1895 |
| 1,296,165 | Costuma | Mar. 4, 1919 |
| 1,392,108 | Bilterman | Sept. 27, 1921 |
| 2,061,628 | Huck | Nov. 24, 1936 |
| 2,466,546 | Huelster | Apr. 5, 1949 |
| 2,466,811 | Huck | Apr. 12, 1949 |
| 2,511,920 | Keller | June 20, 1950 |
| 2,542,144 | Kearns | Feb. 20, 1951 |
| 2,751,809 | Barker | June 26, 1956 |
| 2,795,989 | Koenig | June 18, 1957 |

FOREIGN PATENTS

| | | |
|---|---|---|
| 1,136,681 | France | Dec. 29, 1956 |
| 790,051 | Great Britain | Feb. 5, 1958 |